United States Patent
Matsumura

(10) Patent No.: US 6,651,711 B2
(45) Date of Patent: Nov. 25, 2003

(54) PNEUMATIC TIRE HAVING BLOCKS AT PITCHES

(75) Inventor: Sadahiko Matsumura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/908,799

(22) Filed: Jul. 20, 2001

(65) Prior Publication Data

US 2002/0026971 A1 Mar. 7, 2002

(30) Foreign Application Priority Data

Jul. 21, 2000 (JP) ........................ 2000-221081

(51) Int. Cl.⁷ .................. B60C 11/11; B60C 107/00; B60C 113/00
(52) U.S. Cl. .................. 152/209.2; 152/209.11
(58) Field of Search .................. 152/209.2, 209.11

(56) References Cited

U.S. PATENT DOCUMENTS 3,951,191 A * 4/1976 Suzuki et al.
4,267,872 A * 5/1981 Kamiya

FOREIGN PATENT DOCUMENTS

| JP | 58-164406 | * | 9/1983 |
| JP | 2-74405 | * | 3/1990 |
| JP | 2-136306 | * | 5/1990 |
| JP | 2-225102 | * | 9/1990 |
| JP | 3-148311 | * | 6/1991 |
| JP | 3-204305 | * | 9/1991 |
| JP | 3-295709 | * | 12/1991 |
| JP | A5104911 | | 4/1993 |
| JP | 6-171311 A | | 6/1994 |

* cited by examiner

Primary Examiner—Steven D. Maki
(74) Attorney, Agent, or Firm—Birch, Stewart, Kolasch & Birch, LLP

(57) ABSTRACT

A pneumatic tire has a tread portion curved so that the maximum section width of the tire lies between tread edges. The tread portion is provided with central blocks arranged circumferentially of the tire at pitches P1, axially outer blocks arranged circumferentially of the tire at pitches P3, and middle blocks arranged circumferentially of the tire at pitches P2 between the central blocks and axially outer blocks: the pitches P1 have a longer length than the pitches P2 and the central blocks, and the middle blocks are substantially aligned every two or more (number n) pitches P1; two or more circumferential positions at which the central blocks and the middle blocks are substantially aligned are provided around the tire; circumferential positions of the axially outer blocks are between the middle blocks.

8 Claims, 3 Drawing Sheets

PNEUMATIC TIRE HAVING BLOCKS AT PITCHES

The present invention relates to a pneumatic tire suitable for rough terrain, more particularly to a block type tread pattern being capable of displaying good performance in a wide variety of conditions.

A motocross tire of a pneumatic tire designed for rough terrain is usually provided with a block type tread pattern.

For example, the laid-open Japanese patent application JP-A-6-171311 discloses a motorcycle tire having a block pattern designed for muddy terrain. The laid-open Japanese patent application JP-A-5-104911 discloses a motorcycle tire having a block pattern designed for soft terrain such as sands.

In general, a block pattern in which priority is given to traction in soft terrain tends to show insufficient traction for running in hard terrain. Likewise a block pattern in which priority is given to traction in hard terrain tends to show insufficient traction for running in soft terrain. It is difficult for a block pattern tire to display good traction in both soft terrain and hard terrain. Therefore, in a motocross race for example in which a tire undergo wide variety conditions, it is difficult to shorten the lap time if failed in tire selection.

It is therefore, an object of the present invention to provide a pneumatic tire having an improved tread pattern being capable of displaying good performance such as traction under a wide variety of conditions in both soft and hard terrain.

According to the present invention, a pneumatic tire comprises a tread portion curved so that the maximum section width of the tire lies between tread edges, the tread portion provided with central blocks arranged circumferentially of the tire at pitches P1, axially outer blocks arranged circumferentially of the tire at pitches P3, and middle blocks arranged circumferentially of the tire at pitches P2 between the central blocks and axially outer blocks, wherein the pitches P1 are more than the pitches P2 and the central blocks, and the middle blocks are substantially aligned every two or more (number n) pitches P1, two or more circumferential positions at which the central blocks and the middle blocks are substantially aligned are provided around the tire, and circumferential positions of the axially outer blocks are between the middle blocks.

An embodiment of the present invention will now be described in detail in conjunction with the accompanying drawings.

Figure 1:
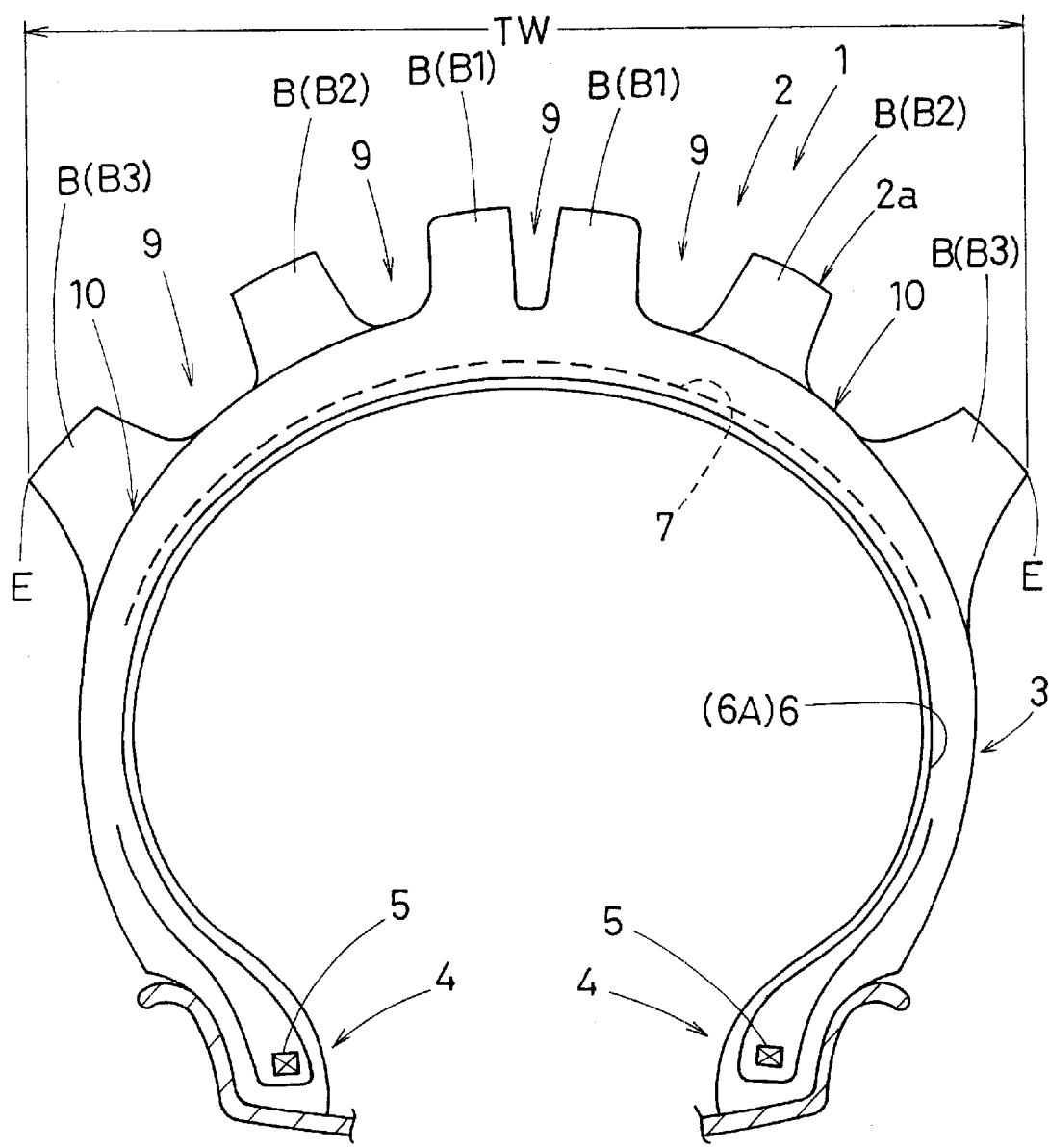
FIG. 1 is a cross sectional view of a pneumatic tire according to the present invention.

In the drawings, pneumatic tire 1 according to the present invention comprises a tread portion 2 with tread edges E, a pair of sidewall portions 3, a pair of bead portions 4 with a bead core 5 therein, a carcass 6 extending between the bead portions 4, and an optional tread reinforcing belt 7 made of cords disposed radially outside the carcass 6 in the tread portion 2.

In the tread portion 2, a plurality of blocks B defining a block pattern are formed by tread grooves which may include circumferential grooves 9 and axial grooves 10.

In this embodiment, the tire 1 is for cross-country motorcycles. The tread portion 2 is curved at a relatively small radius when compared with the passenger car tires, truck/bus tires and the like. As a result, the maximum sectional width TW of the tire lies between the tread edges E.

The above-mentioned carcass 6 is composed of at least one ply 6A of rubberized cords. In this example, the carcass 6 is composed of two cross plies each made of cords arranged at an inclination angle in a range of from 30 to 65 degrees with respect to the tire equator C. For the carcass cords, organic fiber cords, e.g. polyester, nylon, rayon, aramid and the like are preferably used in this example. In this invention, however, it is also possible to use metallic cords (steel cords) in a carcass ply, and to use a radial structure in which carcass cords are arranged at an angle of 85 to 90 degrees with respect to the tire equator C.

Figure 2:
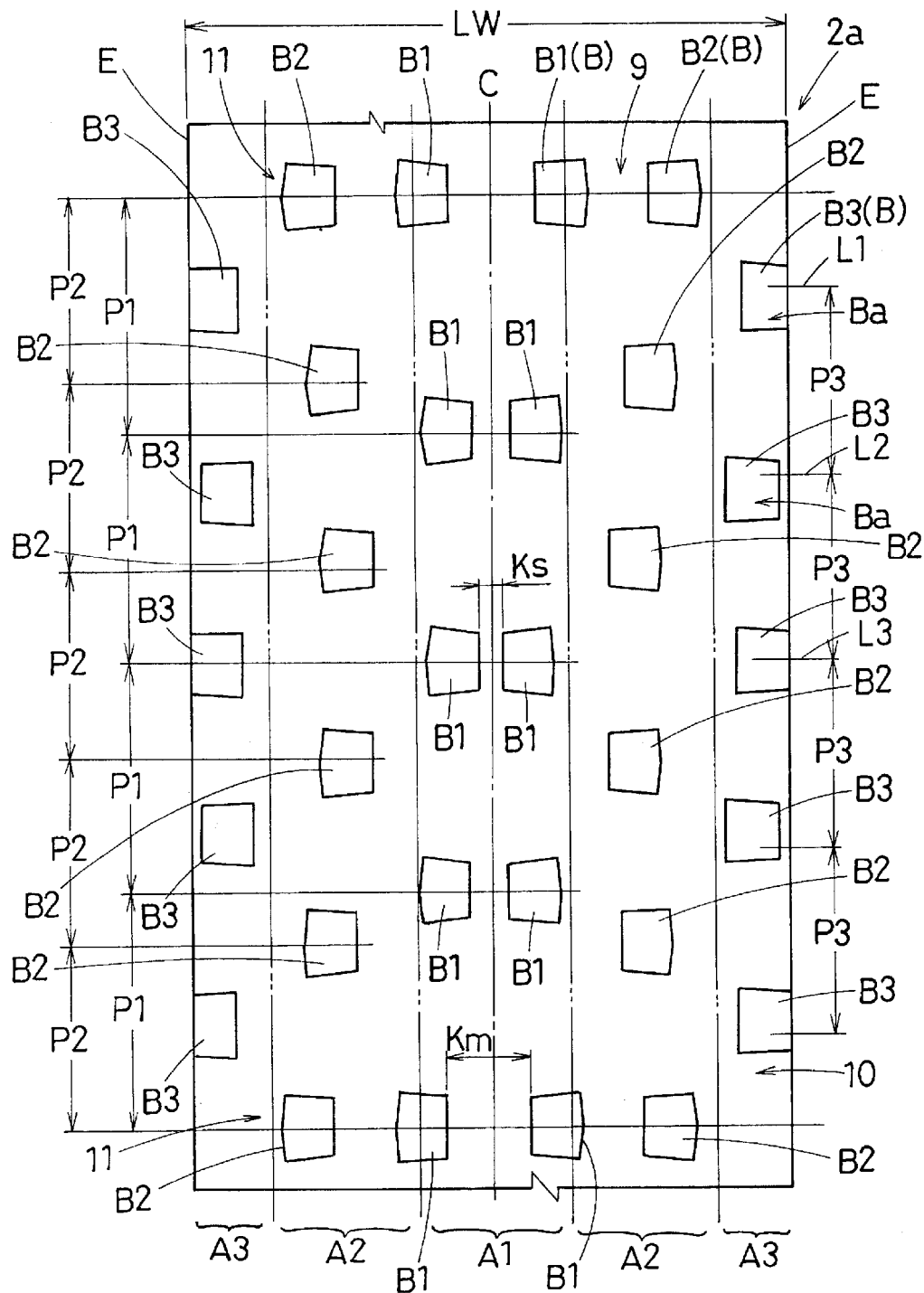
FIG. 2 is a developed plan view of the tread portion thereof showing an example of the tread pattern according to the present invention.

In FIG. 2, the curved tread portion 2 is shown as being developed in a plane.

In this developed state, the tread 2a has a width LW between the tread edges E (hereinafter the "developed tread width LW").

Using this developed tread width LW, a central region A1, a pair of middle regions A2 and a pair of axially outer regions A3 are defined as follows: the central region A1 is centered on the tire equator C and has 25% of the developed tread width LW; the axially outer regions A3 each extends axially inwardly from one of the tread edges E by 12.5% of the developed tread width LW; and the middle regions A2 between the central region A1 and axially outer regions A3 each have 25% width of the developed tread width LW.

The above-mentioned tread blocks B comprises central blocks B1, middle blocks B2 and axially outer blocks B3, each defined as follows. The central block B1 is defined such that more than 50% of the ground contacting top face thereof is included in the central region A1. The middle block B2 is defined such that more than 50% of the ground contacting top surface thereof is included in one of the middle regions A2. The axially outer block B3 is defined such that more than 50% of the ground contacting top surface thereof is included in one of the axially outer regions A3.

The central blocks B1 are arranged in the tire circumferential direction at circumferential pitches P1. The middle blocks B2 are arranged in the tire circumferential direction at circumferential pitches P2. The axially outer blocks B3 are arranged in the tire circumferential direction at circumferential pitches P3.

In this embodiment, all the blocks B1, B2 and B3 have almost rectangular shapes and substantially the same sizes. In the present invention, however, another shape may be used, and further it is possible to use different shapes for blocks B1, B2 and B3.

The blocks B are not provided with any narrow groove inclusive of sipe or cut.

In the FIG. 2 example, the central blocks B1 are pairs of right-hand and left-hand central blocks B1, wherein the paired right-hand and left-hand central blocks B1 are disposed on the right-hand and left-hand of the tire equator, respectively, at the circumferentially same position. The axial distances K between the right-hand and left-hand central blocks B1 are changed along the tire circumferential direction, cyclically, repeating gradual increase and gradual decrease. The ratio (Km/Ks) of the maximum distance Km to the minimum distance Ks is set in a range of from 2.0 to 5.0.

The right-hand central blocks B1 are disposed along a wavy line (e.g. sine curve). The left-hand central blocks B1 are also disposed along a wavy line which is symmetrical with that of the right-hand central blocks about the tire equator C.

In this example, the paired right-hand and left-hand blocks are provided, but a single block may be provided in the central region A1 instead of the paired right-hand and left-hand blocks. Further, a mixture of a pair of right-hand and left-hand blocks and a single block is also possible. For example, by providing the minimum distance Ks=0, the right-hand and left-hand blocks becomes a single block. Such block arrangement is acceptable.

The pitches P1 for the central blocks B1 are set in a range of from 30 to 70 mm. Here, it is not always necessary that the pitches P1 are a constant value. Small variations are permitted. This is also true of the other pitches P2 and P3.

The pitches P2 for the middle blocks B2 are set to be less than the pitches P1.

Although the pitches P2 are different from the pitches P1, in a plurality of circumferential positions 11 around the tire, the central blocks B1 and the middle blocks B2 are substantially aligned (hereinafter the "block aligned position 11").

The block aligned positions 11 are provided at every two or more (number n) pitches P1. Preferably, the number (n) is set in a range of from 3 to 8, more preferably from 4 to 6. In FIG. 2, the number (n) is 4, namely, the block aligned positions 11 are provided at every four pitches P1. In each position 11, two central blocks B1 and two middle blocks B2 are in line. Generally, it may be said that one pitch P2 is n/(n+1) times one pitch P1.

The above-mentioned change in the axial distances between the paired right-hand and left-hand central blocks B1 are made synchronously with a period of number (n) pitches P1 in such a way that the axial distances becomes maximum in the block aligned positions 11 and minimum in the middle position therebetween.

In this example, the middle blocks B2 in each middle region A2 are disposed along a wavy line which is in a parallel relationship with the above-mentioned wavy line of the right-hand or left-hand central blocks axially inwardly adjacent to the middle blocks B2. As a result, in the block aligned positions 11, the blocks B1 and B2 aligned in the axial direction are almost equidistant from each other.

The pitches P3 for the axially outer blocks B3 are not more than the pitches P2 for the middle blocks B2, and the ratio (P2/P3) is in a range of from 1 to 1.5.

The circumferential positions of the axially outer blocks B3 are between the middle blocks B2 so that the axially outer blocks B3 and middle blocks B2 are staggered. In other words, the axially outer blocks B3 are not aligned with the adjacent middle blocks B2. As to the axial positions, the axially outer blocks B3 are disposed along a substantially straight line. The above-mentioned tread edge E is thus defined by a straight line drawn tangential to the axially outermost edges or points of the ground contacting top surfaces of the axially outer blocks B3.

In the example shown in FIG. 2, the pitches P3 are substantially equal to the pitches P2. The circumferential positions of the axially outer blocks B3 are in the middle between the middle blocks B2.

As to the above-mentioned small variations of the pitches P1, P2 and P3, given that the average pitch is the circumference divided by the number of the pitches (P1 or P2 or P3), the ground contacting top faces of the blocks are not deviate from axial lines which are drawn at regular pitches equal to the average pitch. The small variations means that such condition is satisfied. The above description of the pitches P1, P2 and P3 will be better understand by considering such average pitch.

Further, it is preferable that the land/sea ratio (L/S) of the tread is set in a range of from 18 to 28%. The land/sea ratio (L/S) is the ratio of the land area L which is the total area of the ground contacting top faces Ba of all the blocks B to the sea area which is the remaining area.

Comparison Test

Figure 3A:
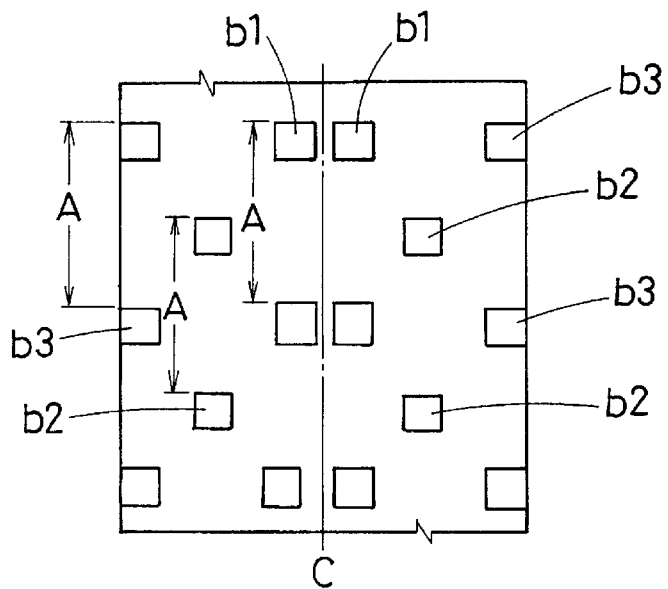
FIGS. 3A and 3B are developed plan views showing tread patterns of reference tires used in comparison tests.
Figure 3B:
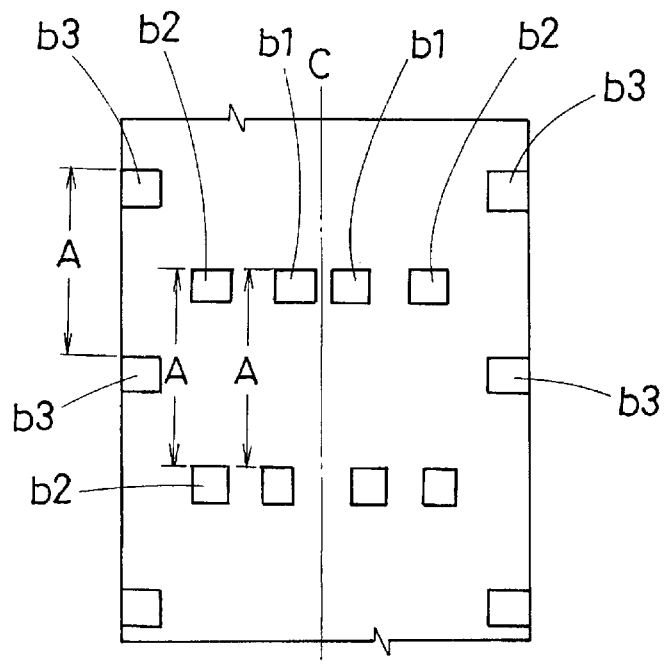

Test tires having the internal structure shown in FIG. 1 and the tread patterns shown in FIGS. 2, 3A, 3B were made and tested for traction and handling during running in soft, hard and medium terrain.

Using a 250 cc cross-country motorcycle provided on the front and rear wheels with test tires (size: front 90/100-20, rear 110/90-19), traction and handling especially stability during cornering were evaluated into five ranks by the test rider's feeling. The test results are shown in Table 1.

TABLE 1

| Tire Pattern | Ex. FIG. 2 | Ref. 1 FIG. 3A | Ref. 2 FIG. 3B |
|---|---|---|---|
| Tread width LW (mm) | | | |
| Front | 100 | 100 | 100 |
| Rear | 130 | 130 | 130 |
| Height of Blocks (mm) | | | |
| Front | 11.5 | 11.5 | 11.5 |
| Rear | 17 | 17 | 17 |
| Land/sea ratio (%) | | | |
| Front | 20 | 20 | 20 |
| Rear | 20 | 20 | 20 |
| Number of Block-aligned positions 11 | | | |
| Front | 11 | — | — |
| Rear | 9 | — | — |
| Pitch (mm) | | | |
| Front | | | |
| P1 | 49.7 | 49.7 | 49.7 |
| P2 | 39.8 | 49.7 | 49.7 |
| P3 | 39.8 | 49.7 | 49.7 |
| Rear | | | |
| P1 | 59.6 | 59.6 | 59.6 |
| P2 | 47.7 | 59.6 | 59.6 |
| P3 | 47.7 | 59.6 | 59.6 |
| Test results | | | |
| Hard | | | |
| Traction | C | E | E |
| Handling | C | E | E |
| Medium | | | |
| Traction | A | D | D |
| Handling | A | D | D |
| Soft | | | |
| Traction | A | A | A |
| Handling | B | B | B |

A: excellent,
B: good,
C: Ok,
D: not so good,
E: bad

As apparent from the test results, in the tires according to the present invention, the applicable range was widened from soft terrain towards hard terrain, completely covering medium terrain. In case of the test tires having a land/sea ratio of 20%, the most suitable application may be towards medium and soft terrain. However, by setting the land/sea ratio in a range of 22 to 28%, the suitable application was changed towards the hard terrain. By setting the land/sea ratio in a range of 20 to 24%, the suitable application was changed toward medium terrain. By setting the land/sea ratio in a range of 18 to 22%, the suitable application was changed toward soft terrain. In any case, the applicable range was considerably widened.

The present invention is suitably applied to motorcycle tires, but it may be applied to pneumatic tires for various vehicles such as sand buggy and the like.

What is claimed is:

1. A pneumatic tire comprising a tread portion curved so that the maximum section width of the tire lies between tread edges, the tread portion provided with central blocks arranged circumferentially of the tire at pitches P1, axially outer blocks arranged circumferentially of the tire at pitches P3, and middle blocks arranged circumferentially of the tire at pitches P2 between the central blocks and axially outer blocks, wherein the pitches P1 have a greater length than that of the pitches P2 and the central blocks, and the middle blocks are substantially aligned every two or more (number n) pitches P1, two or more circumferential positions at which the central blocks and the middle blocks are substantially aligned are provided around the tire, and circumferential positions of the axially outer blocks are between the middle blocks, and wherein between said two or more circumferential positions at which the central blocks and the middle blocks are substantially aligned, the number of pitches P2 is (n+1) whereas the number of pitches P1 is (n).

2. The pneumatic tire according to claim 1, wherein the land/sea ratio of the tread portion is in a range of from 18 to 28%.

3. The pneumatic tire according to claim 1, wherein the central blocks are pairs of right-hand and left-hand blocks, the paired right-hand and left-hand blocks are disposed one on each side of the tire equator in the substantially same circumferential positions.

4. The pneumatic tire according to claim 3, wherein the axial distances between the paired right-hand and left-hand blocks are cyclically changed in the circumferential direction.

5. The pneumatic tire according to claim 3, wherein the right-hand blocks are on a wavy circumferential line, and the left-hand blocks are on a wavy circumferential line which is symmetrical with the wavy circumferential line of the right-hand blocks about the tire equator.

6. The pneumatic tire according to claim 5, wherein the middle blocks are on a wavy circumferential line which is similar to the wavy circumferential line of the adjacent central blocks.

7. The pneumatic tire according to claim 1, wherein the average length $P1_{av}$ of the pitches P1, the average length $P2_{av}$ of the pitches P2 and the average length $P3_{av}$ of the pitches P3 are $P1_{av} > P2_{av} = P3_{av}$.

8. The pneumatic tire according to claim 1, wherein the average length $P1_{av}$ of the pitches P1, the average length $P2_{av}$ of the pitches P2 and the average length $P3_{av}$ of the pitches P3 are $P1_{av} > P2_{av} = P3_{av}$.

* * * * *